C. P. SNYDER.
TRANSMISSION MECHANISM.
APPLICATION FILED FEB. 23, 1917.
1,244,557.
Patented Oct. 30, 1917.
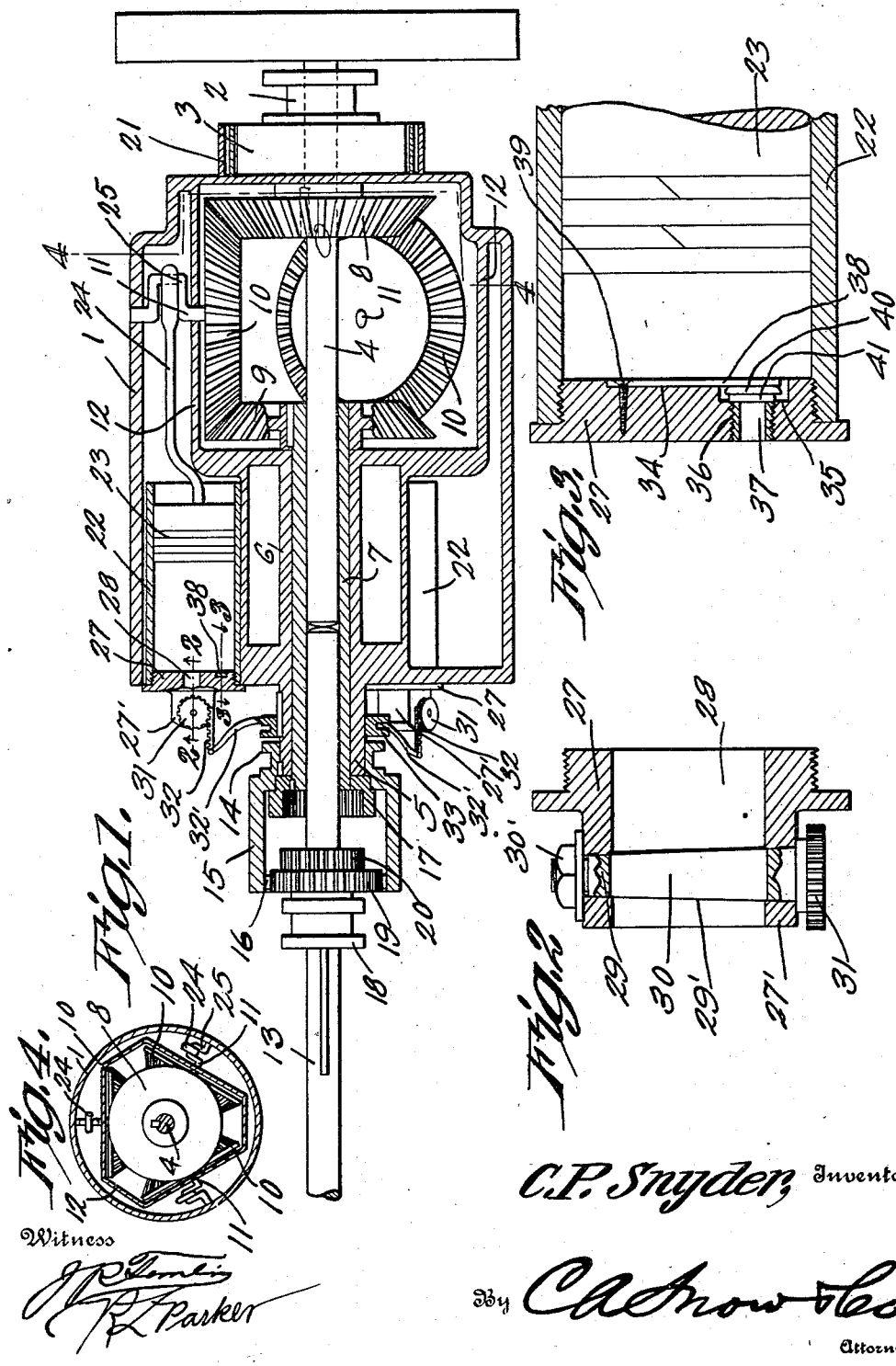
C. P. Snyder, Inventor
By C. A. Snow & Co.
Attorney
Witness
J. R. Tomlin
R. L. Parker

UNITED STATES PATENT OFFICE.

CHARLES P. SNYDER, OF MOUNT CARMEL, PENNSYLVANIA, ASSIGNOR OF THREE HUNDRED AND FORTY-THREE SIX-HUNDREDTHS TO HARRY A. BIRD, THOMAS J. CAMP, SIMON GEIST, MORRIS BLOOM, THOMAS H. TIDDY, H. OLIVER MOSER, AND PRESTON A. VOUGHT, ALL OF MOUNT CARMEL, PENNSYLVANIA.

TRANSMISSION MECHANISM.

1,244,557.  Specification of Letters Patent.  Patented Oct. 30, 1917.

Application filed February 23, 1917. Serial No. 150,542.

*To all whom it may concern:*

Be it known that I, CHARLES P. SNYDER, a citizen of the United States, residing at Mount Carmel, in the county of Northumberland and State of Pennsylvania, have invented a new and useful Transmission Mechanism, of which the following is a specification.

The present invention appertains to transmission mechanisms and is particularly an improvement over the transmission gearing disclosed in my Patent No. 1,196,820, granted September 5, 1916.

It is the object of the invention to provide a transmission of the character disclosed in said patent, which is devoid of shifting gears and the like, and which is controlled pneumatically or by a fluid, the present improvements residing in the provision of novel valves for controlling the flow of fluid into and out of the cylinders.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Figure 1 is a longitudinal section of the mechanism, portions being shown in elevation.

Fig. 2 is a sectional detail taken on the line 2—2 of Fig. 1.

Fig. 3 is another sectional detail taken on the line 3—3 of Fig. 1.

Fig. 4 is a reduced cross section on the line 4—4 of Fig. 1.

The structure embodies a rotatable casing 1 provided at one end with a centrally located journal 2 adapted to be journaled in a suitable supporting bearing (not shown), and the casing 1 has fixed thereto a brake drum 3 adjacent the journal 2. A longitudinal driving shaft 4 connected to the engine or other prime mover (not shown) is journaled through said end of the casing concentric or coaxial therewith, and the other end of the casing has an outstanding central neck 5. The casing has a tubular portion 6 therein in alinement with the neck 5, and a tubular shaft 7 is journaled for rotation through the neck 5 and tubular portion 6. The inner end of the driving shaft 4 enters and is journaled for rotation within the tubular shaft 7.

A bevel gear 8 is keyed upon the shaft 4 adjacent the end of the casing 1 having the journal 2, and a similar gear 9 is keyed upon the inner end of the tubular shaft 7 opposite the gear 8. Meshing with both of the gears 8 and 9 is a set of bevel gears 10 (three being preferably used) secured upon the inner ends of radial shafts 11 journaled through the partitions 12 with which the casing is provided therein. The gears 8, 9 and 10 are continually in mesh, and constitute the only gears of the transmission mechanism.

A driven shaft 13 is in alinement with the driving shaft 4 and has one end entering and journaled for rotation within the tubular shaft 7. A journal 14 is secured upon the end of the neck 5 and is adapted to be journaled for rotation in another suitable supporting bearing (not shown) whereby the casing 1 in having its journals 2 and 14 supported by suitable bearings, is capable of rotating about its axis. The neck 5 or journal 14 thereof is provided with an outstanding clutch member 15 surrounding the shaft 13 and provided at its free edge with an internal set of inwardly projecting teeth 16. An interiorly toothed clutch member 17 is secured to the outer end of the tubular shaft 7 within the clutch member 15 and is spaced from the teeth 16, and a sleeve or collar 18 feathered or splined upon the shaft 13 is provided with toothed clutch members 19 and 20 engageable with the teeth 16 and clutch member 17, respectively. The clutch member 19 is of larger diameter than the clutch member 20, and the clutch member 20 is adapted to move into the clutch member 17. When the collar 18 is moved to an intermediate position, the parts are in neutral position, since the driven shaft 13 is disconnected both from the tubular shaft 7, and from the clutch member 15 attached to the casing. When the collar 18 is moved in one direction the clutch member 19 will be engaged with the teeth 16 of the clutch member 15, to connect the shaft 13 rigidly with the casing 1, and when the collar 18 is moved in the other direction the clutch member 20 will be moved within and engaged with the clutch member 17 to connect the shaft 13 rigidly with the tubular shaft 7.

The casing 1 can be held stationary or retarded by means of a brake band 21 surrounding the drum 3 and adapted to embrace the same, said brake band being operated in any suitable manner.

The pneumatic control of the mechanism includes three cylinders 22 (one for each gear 10) secured within the casing 1 and arranged longitudinally and parallel with the shafts. A piston 23 is slidable within each cylinder, and is connected by a connecting rod 24 with a crank 25 with which the corresponding shaft 11 is provided, whereby when the gears 10 are rotated relative to the casing 1, the cranks 25 are rotated for reciprocating the pistons.

The inner ends of the cylinders 22 are open, while the outer ends are closed by heads or plugs 27 each having an outstanding diametrical boss 27'. Each head 27 and its boss is provided with an elongated or slot-shaped port 28 disposed longitudinally of the boss, and the boss has a longitudinal tapered bore 29' therein intersecting the port 28. Rotatable within the bore 29' is a tapered valve or plug 29 having a longitudinal slot 30 movable into and out of registration with the port 28. A gear 31 is secured to one end of the valve 29 and abuts against one end of the boss 27', while a nut 30' or other retaining element is engaged upon the other end of the valve for holding it in place within the boss or valve casing 27'. The boss provides a valve casing in which the valve 29 is rotatable for controlling the flow of fluid through the port 28. Racks 32 mesh with the gears 31 and are attached to radial arms 32' carried by a collar 33 slidable or splined upon the neck 5 to rotate the casing. When the collar 33 is shifted outwardly, the racks 32 are moved outwardly to open the valves 29, and when the collar 33 is shifted inwardly, the valves will be closed. The valves 29 can thus be controlled by shifting the collars 33.

In order to let air into each cylinder when the piston 23 moves away from the head 27, said head is provided at one side of the boss or valve casing 27' with an inner shallow recess 34, a deeper recess 35 at one end of the recess 34, and an opening 36 leading to the recess 34. A tubular valve seat 37 is fitted in the opening 36 and projects into the recess 35, and a leaf spring 38 is fitted in the recess 34 and has one end secured therein by a screw 39. The free end of the leaf spring projects partially across the recess 35 and carries a valve disk 40 having a suitable packing 41 seatable against the seat 34 to close the port thereof.

Any suitable number of cylinders 22 and accompanying parts can be employed, as may be found most satisfactory under the circumstances.

In operation, to disconnect the shaft 13 from the driving shaft 4, the collar 18 is shifted to neutral position to disconnect the shaft 13 from the casing 1 and tubular shaft 7, and the collar 33 is also shifted to turn the valves 29 to open position, whereby air can flow readily through the ports 28 into and out of the cylinders as the pistons reciprocate. Then, as the driving shaft 4 rotates, to rotate the gear 8, the casing 1 can rotate freely if the gears 10 are carried around the shaft 4, and the gears 10 can also rotate freely about their axes to rotate the gear 9 and shaft 7, and to reciprocate the pistons 23. This provides a "double" neutral, since even if the valves 29 are closed, to impede the rotation of the gears 10 relative to the casing, the casing can rotate freely, and if the collar 18 is shifted to engage either of the clutch members 15 or 17, with the valves 29 open, the gears 10 can rotate freely relative to the casing without the shaft 13 being rotated. To rotate the shaft 13 in a forward direction, or in the same direction as the shaft 4, the collar 18 is shifted to bring the clutch member 19 into engagement with the clutch member 15, whereby the shaft 13 is connected rigidly with the casing 1. Now, the gear 8 in rotating will rotate the gears 10 about their axes, thus rotating the cranks 25 and reciprocating the pistons 23. As long as air is free to flow into and out of the cylinders, the pistons can reciprocate without difficulty, and to start the rotation of the shaft 13, the collar 33 is shifted to turn the valves 29 to closed position. When the valves 29 are completely closed, the flow of air into and out of the cylinders is shut off, and this provides closed air chambers between the pistons 23 and heads 27, preventing the reciprocation of the pistons, and thus preventing the rotation of the gears 10 relative to the casing. As a result, the gears 10 will be moved around the shaft 4 with the gear 8, thus rotating the casing 1, and rotating the shaft 13 with the casing at the same velocity as the shaft 4. In this case, there are no relatively rotating parts, since all parts rotate as a unit, it being possible, however, for the pistons 23 to move slightly within the cylinders to permit of a yielding action between the driving and driven shafts, due to the provision of the air cushions within the cylinders. This serves to absorb shocks and it is desirable for other obvious reasons. When the valves 29 are only partially closed, to allow a restricted flow of air into and out of the cylinders, the movement of the pistons 23 is only partially impeded, thus allowing the gears 10 to rotate slowly relative to the casing, thereby allowing the casing 1 to rotate slower than the shaft 4, and also rotating the shaft 13 at a slower velocity. By controlling the position of the throttle valves 29 to regulate the flow of air or fluid, the speed of the driven shaft can be controlled to a nicety, and any speed can be obtained between neutral and high gear. In the high gear, the shaft 13 is rotated with and at the same velocity as the shaft 4.

To obtain a reverse speed of the driven shaft 13, the collar 18 is shifted to bring the clutch member 20 into engagement with the clutch member 17, whereby the shaft 13 is connected rigidly with the tubular shaft 7, but as long as the casing rotates, the shaft 13 will be passive, since the gear 9 need not rotate. Thus, the gear 8 in being rotated will rotate the gears 10 about their own axes and about the axes of the shaft 4, the pistons 23 being free to reciprocate. By impeding or slowing up the rotation of the casing 1, the shaft 7 will be rotated. Thus, by applying the brake band 21 to the drum 3, to retard the rotation of the casing 1, the gears 10 cannot now rotate as easily about the shaft 2 as before, and this will result in the gears 10 rotating the gear 9 to actuate the shaft 7 and the driven shaft 13 which is connected to the shaft 7. In this case, the gear 9 is rotated in the direction reverse to the direction of rotation of the gear 8, due to the intervention of the gears 10 between the gears 8 and 9, and the shaft 13 is therefore rotated in a direction reverse to the shaft 4.

It will be noted that each piston can move adjacent to the head 27 without interference by the spring 38 and its valve, and when the piston moves away from the head 27, air will be sucked freely into the cylinder past the check valve 40 to fill the cylinder with air for compression when the piston moves toward the head. In this manner, air is sucked freely into the cylinders when the pistons move in one direction, thereby filling said cylinders with air, and avoiding a partial vacuum therein. This will increase the compressive resistance of the air when the pistons move in the other direction. The mechanism therefore utilizes the compression of air instead of the suction thereof, with the valves 40 arranged as shown. If it were not for the valves 40, the flow of air into and out of the cylinders would be restricted during the movement of the pistons in both directions, and there would be wasted movements of the parts, at the points where the pistons change their movements from one direction to the other, due to the compression or expansion of the air. For example, when the piston moves toward the head, the air is compressed to resist the movement of the parts, and if air were not admitted freely into the cylinder during the movement of the piston away from the head, then the air would be rarefied. The air would be under compression at the moment that the piston started away from the head, and this would even assist in the movement of the piston away from the head, which would be objectionable. This objection is remedied by the provision of the valves 40 which admit air freely into the cylinders as the pistons move in one direction, whereby the movement of the pistons in the other direction is thoroughly effective for the intended purpose.

The collars 18 and 33 are grooved for the connection of a suitable operating device, whereby said collars can be shifted manually.

The air throttle provides effective means for controlling the speed, and it will be noted that in all speeds forward, it is possible for the driving and driven shafts to yield relative to one another for absorbing shocks and strains. This relieves the engine, tires, gears and other parts of unnecessary strains and jars, and also provides for the smooth operation of the machine. With the present mechanism, the ordinary clutch between the engine and driving shaft need not be used, since the present mechanism is operable for quickly and effectively disconnecting the driving and driven shafts. The gears of the present mechanism are continually in mesh, and there are no shifting gears, springs or other objectionable features as exist in shift gear transmission mechanisms. The present transmission mechanism is adapted especially for use in automobiles, but can be used in water crafts, factories, and elsewhere to provide a variable speed connection between a driving and a driven shaft. When the mechanism is used in an automobile, it is possible to set the mechanism to "reverse" when the machine is traveling down grade, to thereby provide means for retarding the motion of the machine, and without danger to the machine, due to the provision of the air cushions.

Having thus described the invention, what is claimed as new is:—

1. A transmission mechanism embodying driving and driven members, a cylinder carried by one of them, a piston connected to the other and working within the cylinder, means for controlling the flow of fluid into and out of the cylinder, and means for admitting air freely into the cylinder when the piston moves in one direction.

2. A transmission mechanism embodying driving and driven members, a cylinder carried by one of them having a head provided with an inlet and outlet port and a relief port, a piston connected with the other member and working in the cylinder, means for controlling the flow of fluid through the inlet and outlet port, and means for normally closing the relief port and arranged to be opened when the piston moves away from the head.

3. A transmission mechanism embodying rotatable driving and driven members, a cylinder carried by one of them, a piston connected with the other and working in the cylinder, means for controlling the flow of fluid into and out of the cylinder, and a check valve for admitting air freely into the cylinder when the piston moves in one direction.

4. A transmission mechanism embodying rotatable driving and driven members, a cylinder carried by one of them, a piston connected with the other and working in the cylinder, means for controlling the flow of fluid into and out of the cylinder, the cylinder having a relief port, a leaf spring carried by the cylinder within the same and a valve carried by the leaf spring for closing the relief port, and adapted to open when the piston moves away from it.

5. A transmission mechanism embodying rotatable driving and driven members, a cylinder carried by one of them having a head, a piston connected with the other member and working in the cylinder, said head having an inner shallow recess, a deeper recess at one end of the shallow recess and an opening leading to the deeper recess, a tubular valve seat fitted in said opening and projecting into the deeper recess, a leaf-spring secured in the shallow recess and having its free end extending partially across the deeper recess, and a valve carried by the leaf spring seatable against said seat.

6. A transmission mechanism embodying rotatable driving and driven members, a cylinder carried by one of them, a piston connected with the other and working in the cylinder, a longitudinally slidable collar carried by the same member that carries the cylinder, an oscillatory valve for the cylinder to control the flow of fluid into and out of the same, a gear connected to said valve, and a rack connected to said collar and meshing with said gear.

7. A transmission mechanism embodying rotatable driving and driven members, a cylinder carried by one of them and having a head, a piston connected with the other member and working in the cylinder, a slidable member carried by the same member which carries the cylinder, said head having an outstanding valve casing and a port extending through said valve casing, a valve mounted to turn in said casing and controlling said port, said valve being parallel with said head, and an operative connection between said slidable member and valve.

In testimony that I claim the foregoing as my own, I have hereto affixed my signature in the presence of two witnesses.

CHARLES P. SNYDER.

Witnesses:
WILLIAM WELLMAN,
L. B. ZIMMERMAN.